United States Patent [19]
Schiller

[11] Patent Number: 5,737,452
[45] Date of Patent: Apr. 7, 1998

[54] METHOD OF GENERATING A THRESHOLD ARRAY

[75] Inventor: Stephen N. Schiller, Hayward, Calif.

[73] Assignee: Adobe Systems Incorporated, San Jose, Calif.

[21] Appl. No.: 755,803

[22] Filed: Dec. 17, 1996

Related U.S. Application Data

[63] Continuation of Ser. No. 236,493, Apr. 29, 1994, abandoned.
[51] Int. Cl.$^6$ .............................. H04N 1/40; G06K 9/38; G06K 9/40
[52] U.S. Cl. .......................... 382/270; 382/265; 382/275; 358/455; 358/460; 358/465
[58] Field of Search ...................... 382/270, 254, 382/275, 260, 261, 262, 263, 264, 265, 271, 272; 358/460, 467, 462, 465, 466, 456, 455, 458; 348/606, 607

[56] References Cited

U.S. PATENT DOCUMENTS

| | | | |
|---|---|---|---|
| 5,020,119 | 5/1991 | Tai et al. | 382/50 |
| 5,027,078 | 6/1991 | Fan | 358/456 |
| 5,150,428 | 9/1992 | Leone et al. | 382/50 |
| 5,150,429 | 9/1992 | Miller et al. | 382/50 |
| 5,210,602 | 5/1993 | Mintzer | 382/54 |
| 5,255,085 | 10/1993 | Spence | 358/455 |
| 5,309,526 | 5/1994 | Pappas et al. | 382/56 |
| 5,313,287 | 5/1994 | Barton | 358/457 |

FOREIGN PATENT DOCUMENTS 0 500 267 A2  8/1992  European Pat. Off. ......... H04N 1/40

OTHER PUBLICATIONS

"Modified Approach to The Construction of a Blue Noise Mask" Meng Yao et al, University of Rochester. Jan. 1994.
Yao et al., Modified Approach to the construction of a blue noise mask, J. Electronic Imaging, Jan. 1994.

*Primary Examiner*—Bipin Shalwala
*Attorney, Agent, or Firm*—Fish & Richardson P.C.

[57] ABSTRACT

A method of generating a threshold array made up of a plurality of dot profiles, each of which is made up of a plurality of black or white pixels, certain of the pixels in certain of the dot profiles being constrained to be either black or white. The steps of the method are: (1) assigning a value to each unconstrained pixel of one of the dot profiles, each such value being interpretable as black or white; (2) based upon whether a function of the values of the pixels within a predetermined area of the dot profile is different from a predetermined desired value, adjusting the value assigned to a particular pixel within the predetermined area such that in a fraction of the cases, the adjusted value is interpretable as the opposite color from the unadjusted value; and (3) repeating step (2) for additional predetermined areas of the dot profile until the entire dot profile has been covered; and repeating steps (1) through (3) for each of the dot profiles in the threshold array, whereby the dot profiles in the resulting threshold array are substantially free of annoying visible patterns.

5 Claims, 3 Drawing Sheets

METHOD OF GENERATING A THRESHOLD ARRAY

This is a continuation of application Ser. No. 08/236,493, filed Apr. 29, 1994, now abandoned.

FIELD OF THE INVENTION

This invention relates to the production of threshold arrays used to generate halftoned images on a variety of digital display or printing devices. Digital halftoning is usually carried out either by using a threshold array or by using error diffusion techniques. Threshold array techniques are fast, easy to implement and accommodate a wide range of digital halftoning systems. Error diffusion techniques can achieve better reproduction fidelity by eliminating large scale artifacts from the halftoned image, but require more processing time and cannot be used on many existing image halftoning systems. Much of the halftoning carried out today is done electronically using a digital computer or other special purpose digital hardware. Digital halftoning is used in the preparation of plates for printing presses, in xerographic and ink jet desk top printers, in computer CRT displays and in other imaging devices.

BACKGROUND OF THE INVENTION AND PRIOR ART

Images with intermediate shades of gray are reproduced on devices that can only produce pixels which are black or white by the well known method of halftoning. Halftoning reproduces a shade of gray with a fine black and white pattern so that the ratio of the black area to the total area in this pattern determines the shade of the gray. The finer the pattern of black and white, the more the viewer perceives the desired shade of gray and the less he or she perceives a pattern of black and white.

The method of digital halftoning carried out by means of a threshold array is well known. Threshold array based halftoning uses the following steps 20, 22, 24, 26 and 28 shown in FIG. 2: (1) sampling the image to be reproduced at each pixel (picture element) of the output device to get an image gray value; (2) obtaining a reference gray value from a threshold array for that pixel; (3) comparing the image gray value against that reference gray value; and (4) using the output of that comparison to determine the color (black or white) of the device pixel when displaying the image.

Threshold arrays typically consist of a rectangular array of reference gray values. This rectangular array is repetitively tiled to cover the raster of the digital output device so that each pixel of the output device corresponds exactly to one reference gray value in one of the tiled copies of the threshold array.

One advantage of threshold array halftoning is that the computation required per pixel is small. It is only necessary to fetch the two gray values and to compare them. This is significant because a high resolution output device, such as used in preparing plates for printing presses, may have to process 500 million pixels per page.

Another advantage of threshold array halftoning is the growing installed base of digital display devices that allow the user to specify a threshold array to be used for halftoning an image. Thus, the owner of such a device may select a threshold array based halftone to be used without the need for changing hardware.

Threshold array based halftoning has largely been used to mimic traditional screen-based photographic halftoning. While screen-based methods are generally adequate, there have always been problems associated with them. One problem is that when four halftoned images are transparently combined, as in a four color press run, the screen angles must be very carefully controlled to avoid "moire" patterns. Moire patterns cause an undesirable visual effect. Another problem is that screen-based methods produce a fine but regular grid of small dots in the halftoned image. This array of dots is visible on close inspection and becomes a reproduction artifact not in the original image. Such artifacts are even more visible when two or more screened images are combined, as in color reproductions. These patterns can be annoying when viewing the image closely.

A different, interrelated group of digital halftoning techniques have been developed over the years. Examples are error diffusion, FM screening or stochastic screening. All these produce somewhat similar results and they will all be referred to herein as stochastic halftoning. In these techniques, a semi-random process is used to create a pattern of very small, seemingly randomly placed dots, while still closely controlling the average spacing between those dots as well as the overall density of black versus white. A summary of error diffusion and threshold array based halftoning is found in "Digital Halftoning" by Robert Ulichney, published by M.I.T. Press, 1987.

Stochastic halftoning techniques can be used partially to solve the problems of the threshold array based halftoning. The undesirable dot patterns is much less visible and the moire patterns are considerably reduced. On the other hand, stochastic halftoning techniques generally require several times as much computation time as threshold array methods, and it is not cost-effective to install stochastic halftoning methods on a pre-exiting threshold array based display device.

One such stochastic halftoning technique is described in "A Markovian Framework for Digital Halftoning" by Robert Geist, Robert Reynolds and Derryl Suggs in the ACM Transactions of Graphics, Vol. 12, No. 2 (April 1993). This article explains halftoning based on random processes that yield results similar to error diffusion. One disadvantage of this method is that it is not threshold array-based and the computations are extremely time-consuming. Moreover, the methods of Geist et al. do not totally avoid patterns that occur when tiling dot profiles to cover a large area.

Another stochastic halftoning technique has been taught in "Digital Halftoning Using a Blue Noise Mask" by Mista and Parker in The SPIE Conference Proceedings, San Jose, 1991, and in a companion paper "The Construction and Evaluation of Halftone Patterns With Manipulated Power Spectra" by Mista, Ulichney and Parker, in the Conference Proceedings for Raster Imaging and Digital Typography, 1992. In these papers, Mista et al. teach a method of constructing dot profiles with a reduced number of annoying patterns, and which reproduce a desired gray level. Mista et al. also describe a specific method of assembling a threshold array from constituent dot profiles. However, the Mista et al. profiles are still not as smooth as required for many applications.

BRIEF DESCRIPTION OF THE INVENTION

Briefly, the invention relates to a method of generating a threshold array made up of a plurality of dot profiles, each of which is made up of a plurality of black or white pixels, certain of which in certain of the profiles being constrained to be either black or white. The generated dot profiles are substantially free of annoying visible patterns. The method begins by the first step of assigning a value to each unconstrained pixel of one of the dot profiles, each such value being interpretable as black or white. In the second step, based upon whether a function of the values of the pixels within a predetermined area of the dot profile is different from a predetermined desired value, adjusting the value assigned to a particular pixel within the predetermined area such that in a fraction of the cases, the adjusted value is interpretable as the opposite color from the unadjusted value.

The second step is repeated for additional predetermined areas of the same dot profile until the entire dot profile has been covered. This second step may be repeated many times, repeatedly cycling through the same dot profile. This entire process is repeated for each of the dot profiles in the threshold array. The dot profiles in the resulting threshold array are substantially free of annoying visible patterns.

The present invention is an improvement over the prior art in that a relatively small threshold array is constructed, providing results similar to error diffusion halftoning techniques. This provides the speed and hardware availability associated with threshold array based halftoning with screening results similar to stochastic halftoning.

DETAILED DESCRIPTION OF THE PREFERRED EMBODIMENT

The method of this invention can be practiced using any of several types of computation devices, which may include a scanner, a computer and a raster display device. The first step of the method of the invention is to prepare a threshold array. This threshold array will typically be computed using a computer or special purpose digital hardware. The threshold array consists of a rectangular array of reference gray values, prepared as set forth below. The threshold array may be kept in temporary or permanent storage associated with the computer, or distributed to other computers, for example on a network or by distribution of diskettes, as is well known in the art. The threshold array is used to halftone original images by methods well known to those skilled in the art.

The threshold array of this invention is produced by assembling a number of "dot profiles". A dot profile is an array of binary values, such as 0 and 1. It has the same width and height as the threshold array. A dot profile corresponds to the pattern of black and white pixels that result when a threshold array is used to halftone a constant gray value. A threshold array yields a particular dot profile for a given gray value. Normally, in halftoning with a threshold array, dot profiles are produced from the array. The method of this invention reverses that process by starting with a set of desired dot profiles and, from them, constructing a threshold array that will yield those same dot profiles when it is used to halftone constant gray values. Each of the dot profiles that are used in assembling the threshold array has a gray value associated with it. The gray value is the one that yields the associated dot profile when compared against the threshold array.

There are certain constraints on dot profiles which must be used, because if a binary value at a given position in a dot profile is black for a particular gray level, then that same binary value must be black for all dot profiles corresponding to all darker gray levels. Likewise if a binary value at a given position in a dot profile for a given intermediate gray level is white, then all binary values in the same position for dot profiles of lighter gray levels also must be white. One of the objects of the invention is to produce a set of dot profiles that satisfy these constraints.

Another object is that each of the dot profiles, when translated into dark and light color values on the intended output device, will result in a pattern of dark and light dots that is free from visible patterns, either alone or when tiled with other copies of itself, and yet still accurately reproduces the color value associated with the dot profile.

Figure 1A:
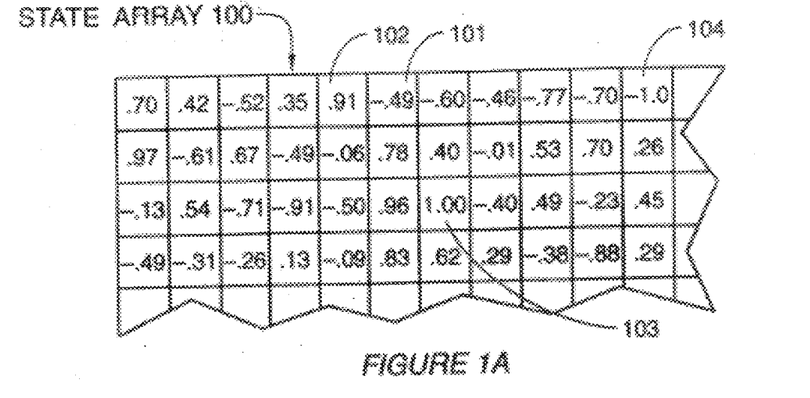
FIGS. 1A, 1B and 1C show in graphical form the various two-dimensional arrays used in the invention and their relation to one another at a particular point in the method of the invention.

The construction of the dot profiles according to the method of the invention is carried out in a specific sequence. An ordering of the associated gray values is constructed and the dot profiles are constructed in that order. The first dot profile in this ordering is constructed by first using a random or pseudo-random number generator or other well known method to compute a random or pseudo-random (herein after merely called a random value) value in the range from −1 to 1 for each position in the dot profile. These random values are stored in a separate array with dimensions the same as those of the threshold array. This array is called the "state array" 100 shown in FIG. 1A. A dot profile can be derived from this state array by considering the sign of the values in the array. A state array value less than zero gives a corresponding binary value of 0 and a state array value greater than or equal to zero produces a binary value of 1. These values are shown in dot profile array 200 in FIG. 1B. Where a black cell indicates the binary value 0 and a white cell indicates the binary value 1. Since the values in the state array of FIG. 1A are random, the initial values in the dot profile array of FIG. 1B also are random, but they are random binary values as opposed to random real values.

Figure 1B:
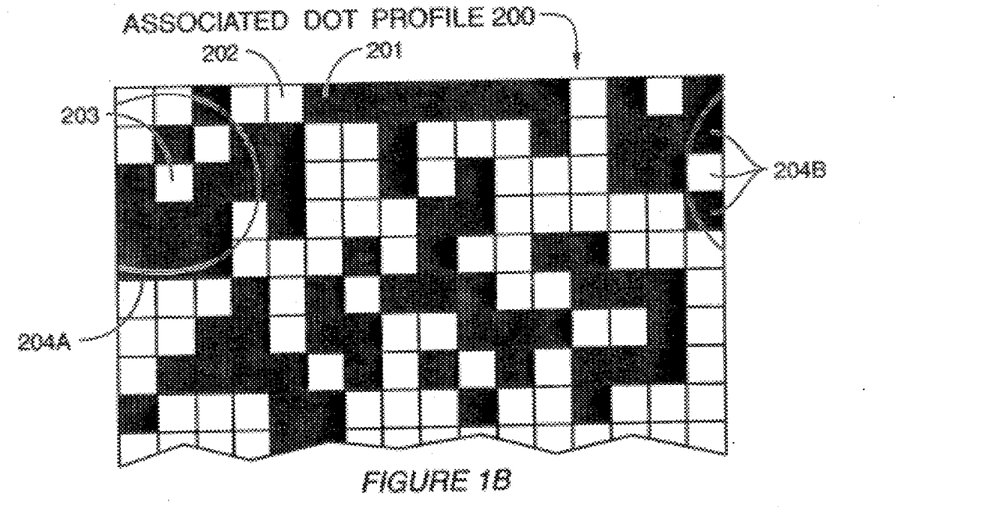
Figure 1C:
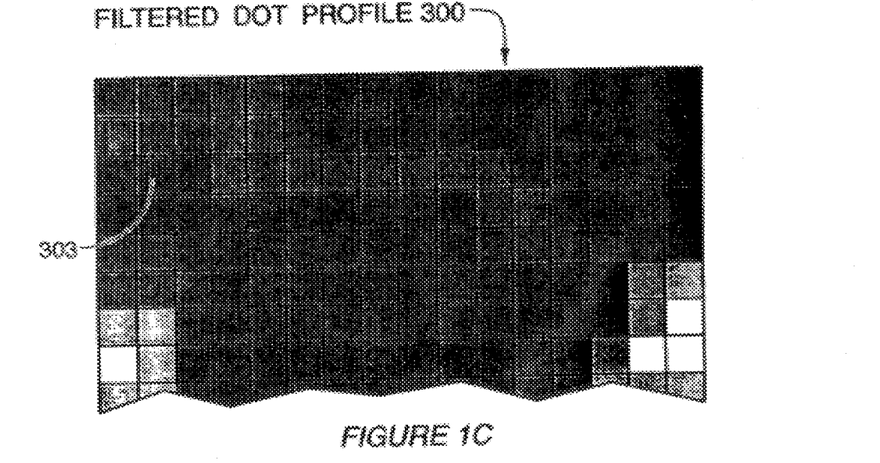

The next step in the method of the invention is to produce a third array of real values, called the filtered dot profile array, represented in FIG. 1C by using darker shades of gray to represent smaller real values and lighter shades of gray to represent larger real values. This array is obtained by applying a digital filter to the dot profile. The digital filter is typically a low pass Gaussian filter and thus the representation of the filtered dot profile 300 shown in FIG. 1C shows how the dot profile might look to a human viewer when blurred.

The next step in the method of the invention adjusts each value in the state array by an amount proportional to the difference between the associated gray level of the dot profile and the corresponding value in the filtered dot profile array. Additional terms may be added to this adjustment as will be explained later. The net effect of this adjustment is that state values are adjusted higher where the filtered dot profile is too dark, and adjusted lower where it is too light. Because of these adjustments, the next time a dot profile is obtained from the state array, the local average gray value at any point will be closer to the associated gray value.

The process outlined above may be repeated many times to achieve better and better corrections to the state array and resulting dot profile. After a certain point, further corrections to the state array will not cause any useful difference in the resulting dot profile. At this point, a different digital filter may be used and the process may again be repeated until no further corrections are useful. Many different digital filters may be used in succession to correct the threshold array in various ways. In particular, it has been found beneficial to use low pass filters of varying cutoff frequencies. Low pass filters with higher cutoff frequencies are used first because they tend to eliminate variations of the average gray value on the scale of 3 to 5 pixels. Low pass filters with lower cutoff frequencies are used later because they tend to insure that the overall average gray value is accurate. At least one filter is used. There is no limit to the number of additional filters.

The steps above create a first dot profile which is one of many. Succeeding dot profiles are constructed in the same way, except that in successive creation techniques, various elements of the dot profile may be constrained to stay either black or white in accordance with the dot profiles already constructed. The method of the invention accommodates these constraints by maintaining the state values for constrained elements to be either +1 or −1 depending upon whether the element is constrained to be white or black. No adjustments will be made to these constrained state values, and hence the resulting dot profile will maintain the constrained values for those elements.

As each new dot profile is completed, elements in the threshold array are updated to include the new dot profile. After all the dot profiles have been completed, the threshold array also is complete. Since the dot profiles were carefully constructed to yield the same average gray value at all points, the resulting threshold array will faithfully reproduce flat gray images as well as other images with a minimum of undesirable visible or regular patterns of dots.

The technique of the invention requires that there be a representation of the threshold array which is used in computer memory. There are many such possible representations, but the method of a preferred embodiment uses a particular one. A threshold array is a rectangular array of reference gray values, for example, W elements wide and H elements high. Each reference gray value is represented as an integer in the range, for example, from 0 to 255. As is known in the art, larger or smaller ranges of integers may be used with certain advantages. Each of the integers representing a reference gray value is stored in computer memory having enough bits to represent the highest value. Where 255 is the largest value, 8 bits are required and the unit of memory used is 8 bits (one byte). In the description that follows, the units of the threshold array are assumed to be bytes, although it is understood that they may be whatever size is appropriate. The arrangement of the reference gray values in memory preferably is a conventional two-dimensional array wherein the elements of the array are laid out in consecutive locations in computer memory so that the address of an element in column C and row R is the base address of the threshold array+C+(R×W).

In addition to the threshold array, the method of the invention uses three other arrays. These are the state array, the kernel array and the filtered dot profile array. The state array is the array of state values for each location in the threshold array as shown in FIG. 1A. The filtered dot profile array is shown in FIG. 1C. The kernel array holds a convolution kernel for a digital filter used to obtain the filtered dot profile array from a dot profile. The topic of convolution kernels is discussed in the well-known reference book "Digital Image Processing" by Kenneth R. Castleman, Prentice Hall, 1979.

Where a computer variable name or C language code is referred to in the body of the text, it is italicized, e.g., *code*. These three additional arrays are represented as two-dimensional arrays of floating point values whose type is float in the C language fragments of the computer code used in the invention and provided hereinafter. The dimensions of these arrays are the same as the dimensions of the threshold array. The layout of elements in these arrays also is the same as the layout of elements in the threshold array, the only difference being that the number of bits required to store the floating point values in these arrays are more than the 8 bits required to store the values of the threshold array. Accordingly, corresponding elements in any two arrays are always the same number of elements away from the beginning of the array. Note that the dot profile is not explicitly stored in memory as a fifth array since its elements can easily be computed at any time by comparing elements in the state array of FIG. 1A against zero.

The arrays mentioned above preferably are global variables in a computer program so that all code has access to them. Also the variables *width* and *height*, which provide the dimensions of all these arrays, also are global to the program.

NOTATION

The invention is specified in terms of fragments of "pseudo code" and fragments of code in the C programming language. Pseudo code is a notation, well known to those skilled in the art, for specifying the overall organization of a number of steps in a computer program. The structure of pseudo code is that of a prototypical high level programming language except that some of the individual steps are descriptions in English of what they do. Pseudo code takes the place of more cumbersome flow charts sometimes used. When helpful to the skilled practitioner, some of these English descriptions in the pseudo code will be explained further and the appropriate C programming language Code Fragments will be provided.

The C programming language, perhaps the most common programming language in use today, is well known to those skilled in the art. A typical reference is "C: A Reference Manual" by Harbison and Steele, Prentice-Hall, 1984.

TOP LEVEL ORGANIZATION

Code Fragment 1 shows pseudo code summarizing the top level control of the computer program.
Code Fragment 1

1. *userParams*=user input;
2. Allocate memory for arrays;
3. Initialize threshold array to all 0's;
4. MakeThresholdArray(*userParams*, 0, 1);
5. Write threshold array out to disk;

The steps carried out by this code are as follows.

Step 1 is for the user to select certain parameters which include: the size of the threshold array; the number of times each digital filter is to be applied to each dot profile; the number of different digital filters to apply; and the characteristics of each of these filters.

Step 2 is to allocate the memory that will be needed for the various arrays used in the program: the threshold array, the state array, the kernel array and possibly others. Memory allocation is carried out by means well known to those skilled in the art.

Step 3 is to initialize the contents of the threshold array to all zeros.

Step 4 is to call the procedure, MakeThresholdArray with the user supplied parameters to compute threshold array. It is also passed the values 0 and 1. These values indicate that it should create dot profiles for the entire range of gray values.

Step 5 is to write the completed threshold array out to a disk file. This step may be omitted if the computer program is part of a halftoning system that will use the threshold array directly from computer memory.

The remaining part of the program is broken down into four units or procedures. Those skilled in the art of computer programming will be familiar with procedures as self-contained units of computer instructions that may be called on at various times to execute the same task, but with different parameters. Modern programming languages cause separate computer memory to be allocated for the temporary storage used in each invocation of a procedure. Thus a procedure may call itself recursively as long as there is some terminating condition to this self-reference.

Figure 2:
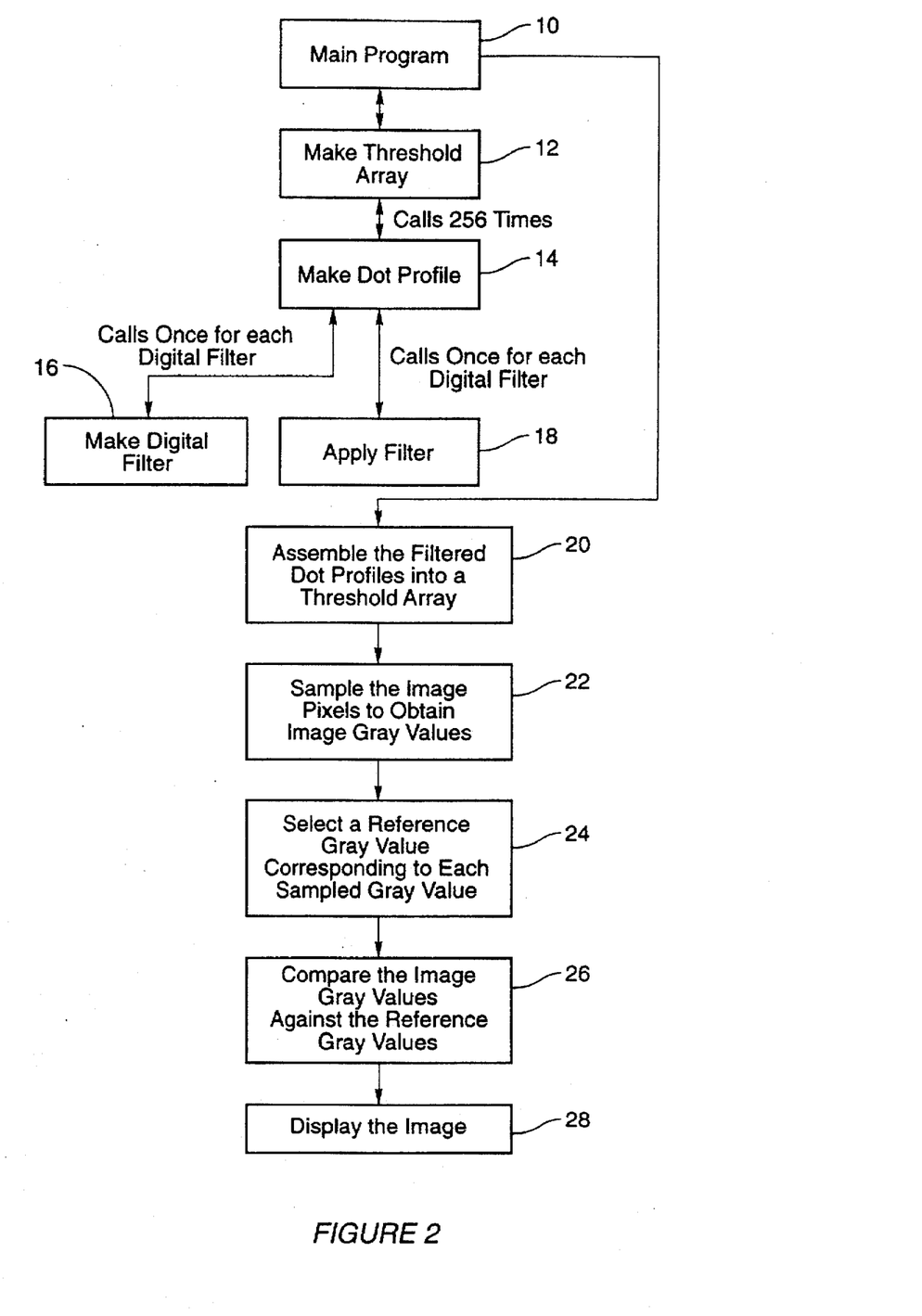
FIG. 2 is a flow chart depicting the overall flow of control among the various procedures used in the method of the invention.

FIG. 2 is a flow chart showing the overall flow of control among the procedures. The main program 10 calls the MakeThresholdArray procedure 12, which manages the entire construction of the threshold array. Its parameters are obtained from the user through the main program, as set forth above. The MakeThresholdArray procedure 12 determines the order of computation of the dot profiles in terms of their associated gray values. It calls the MakeDotProfile procedure 14 to carry out the actual construction of each dot profile.

The purpose of the MakeDotProfile procedure 14 is to construct a single dot profile and to enter information from that dot profile into the threshold array. The dot profile exists as the signs of the values in the state array. The MakeDotProfile procedure 14 has as parameters the gray value for the dot profile to be constructed, the threshold array that is being built and a few others which will be described later. This procedure also has access to all of the parameters of the MakeThresholdArray procedure 12. The MakeDotProfile procedure 14 constructs a number of digital filters by calling a MakeDigitalFilter procedure 16 and applies them to make successive corrections to the dot profile through the state array by calling an ApplyFilter procedure 18.

The MakeDigitalFilter procedure 16 constructs the convolution kernel for a digital filter and stores it in a two dimensional array of real values called the kernel array. It takes as parameters several floating point values describing various characteristics of the convolution kernel, as will be seen in the detailed descriptions of the code fragments which follow.

The ApplyFilter procedure 18 repeatedly applies a digital filter to the dot profile and makes corrections to the state array based upon the filtered values. It takes as parameters the number of times to repeat this process, a digital filter, a state array and other values to be discussed later.

The detailed workings of each of the four procedures shown in FIG. 2 will now be described.

THE MakeThresholdArray PROCEDURE

The MakeThresholdArray (step 20 in FIG. 2) procedure is carried out in Code Fragment 2, below (the line numbers are not part of the language, but are included for reference only).

Code Fragment 2:

```
1. struct UserParameters;
2. typedef int Integer;
3. typedef float Real;
4. void MakeThresholdArray(
       struct Userparameters *userParams,
       Real lowDotDens, Real highDotDens)
5. {
```

Code Fragment 2: -continued

```
6.  Real midDens = (lowDotDens + highDotDens)/2;
7.  Real midGray = DotDensToGray(midDens);
8.  Real lowGray = DotDensToGray(lowDotDens);
9.  Real highGray = DotDensToGray(highDotDens);
10. Integer thrshVal = floor(255*midGray) + 1;
11. Integer lowTVal = floor(255*lowGray) + 1
12. Integer hightTval = floor(255*highGray) + 1
13. if (thrshVal - lowTVal >= 1 &&
        highTVal - thrshVal >= 1) {
14.     MakeDotProfile(
            userParams, midDens,
            lowTVal, highTVal, thrshVal);
15.     MakeThresholdArray(
            userParams, lowDotDens, midDens);
16.     MakeThresholdArray(
            userParams, midDens, highDotDens);
17.     }
18. }
```

Lines 1–3 define data types to be used in this and other C language Code Fragments described later. Line 4 shows the parameters of the procedure. The userParams parameter is a pointer to a structure that contains all of the parameters specified by the user of the program. Since this pointer is merely passed on to another procedure and not otherwise used, the contents of this structure are not of concern at this point. The lowDotDens and highDotDens parameters specify a range of dot densities over which the procedure is to compute dot profiles. The phrase "dot density" in the context of this program refers to the ratio of white dots to the total number of dots in a dot profile. The procedure will create dot profiles for dot densities inside this range, but not for the end points of this range.

The specification of the dot density of a particular dot profile is separated from the specification of the gray value that extracts that dot profile from the threshold array. One might expect that the gray value may be computed from the dot density by multiplication by 255, obviating the need to pass them as separate values to the MakeDotProfile procedure. However, the phenomenon of dot gain on actual physical devices used in halftoning can cause the observed average gray value of the reproduced dot profile to be significantly darker or lighter than what would be expected from the dot density alone. By allowing the program to specify a gray value other than 255 times the dot density, corrections can be made for dot gain on actual devices. The ability to make such a correction is implemented in the present computer program through the DotDensToGray procedure used in line 7 of the above Code Fragment. If no correction is required, this procedure can be coded to simply return its argument. On the other hand, the DotDensToGray may implement a transfer function that returns an actual gray level observed a particular device, normalized to the range form 0 to 1, given the dot density of the dot profile displayed on that device. This transfer function may be implemented by interpolating between values stored in a table in computer memory, or by other techniques well known to those skilled in the art.

Code Fragment 2 works as follows. Line 6 computes the dot density for a dot profile in the middle of the requested dot density range. Lines 7, 8 and 9 compute the corresponding gray values for that dot density and the dot densities at either end of the requested range. Lines 10, 11 and 12 compute values to be stored in the threshold array for dot profiles at the low, middle, and high positions in the requested dot density range. Line 13 checks that the threshold value for the middle dot profile is distinct (when rounded to an integer)

from the threshold values at either end of the range. If the value is distinct, then lines 14, 15 and 16 are executed. Line 14 calls the MakeDotProfile procedure to construct the dot profile for the middle dot density in the requested range. Lines 15 and 16 are then recurslye calls to the MakeThresholdArray procedure to construct the remaining dot profiles in the required range.

The recursire execution of the MakeThresholdArray procedure implicitly creates an order in which dot profiles are constructed. This ordering can be summarized verbally as follows. First the dot profile for the middle dot density value, ½, is created. This splits the remaining dot density value into two ranges, one on each side of ½. These are processed in the same way as the whole range: the middle gray is processed first (this is ¼ for the lower range and ¾ for the upper), and the sub-ranges on each side of those are processed, and so on. This ordering, equivalent to a pre-order transversal of a binary tree, has been found to work well in the preferred embodiment, but other ordering of dot density values as known to those skilled in the art may also be satisfactory. For example, an iterative invocation of MakeThresholdArray, may be used instead of a recurslye invocation.

THE MakeDotProfile PROCEDURE

The workings of the MakeDotProfile procedure will now be explained. The overall logic flow of this procedure is diagrammed the following pseudo Code Fragment 3.

Code Fragment 3:

```
1. MakeDotprofile(
        struct UserParams* userParams,
        Real dotDens, Integer lowTVal,
        Integer highTVal, Integer thrshVal) {
2.   Initialize state array with random values.
3.   kernelSize = userParams->initialSize;
4.   while (kernelSize < userParams->finalSize) {
5.       MakeDigitalFilter(kernelSize, dotDens);
6.       ApplyFilter(
               userParams, dotDens, lowTVal, highTVal);
7.       Rescale entries in the state array;
8.       kernelSize = kernelSize * userParams->sizeInc;
9.   }
10.  Store dot profile info into threshold array;
11. }
```

Line 1 shows the parameters of the procedure to be userParams, dotDens, lowTVal, highTVal, and thrshVal. Others variables, such as the threshold array, are available as global variables.

The meaning of these parameters is as follows. The userParams parameter has the same meaning as above. The dotDens parameter is the dot density of the dot profile to be generated. The thrshVal parameter is the value to be stored in the threshold array to represent the dot profile about to be constructed. If the gray value, thrshVal, is compared against the resulting threshold array, the dot profile that is about to be constructed should result. The lowTVal parameter is the largest value stored in the threshold array so far that is smaller than thrshVal. HighTVal is the smallest value stored in the threshold array so far that is larger than thrshVal. Because of the recursive order in which dot profiles are computed, lowTVal and highTVal are just the threshold values for the end points of the current range of dot densities being computed.

The first step of Code Fragment 3, line 2, is to initialize the values in the state array with random floating point values in the range from −1 to 1, but only if the corresponding element of the dot profile is unconstrained. If the dot profile element is constrained, the state value is −1 if the element is constrained to be black, and 1 if constrained to be white. In order to determine if a given dot profile element is constrained, the value of the corresponding element of the threshold array is compared against the lowTVal and highTVal parameters. If the threshold element is lower than lowRange, the dot profile element is constrained to be black; if higher than or equal to highRange, the dot profile element is constrained to be white. Otherwise the dot profile element is unconstrained.

The Code Fragment 4 in the C programming language below demonstrates one way to carry out this initialization process. The Code Fragment assumes the following variables have the following values prior to its execution: thrPtr is the address in computer memory of the first element in the threshold array; thrEnd is the address of the first byte just after the last element in the threshold array; statePtr is the address of the first element of the state array; and lowTVal and highTVal are the parameters mentioned above.

Code Fragment 4:

```
1. while (thrPtr < thrEnd) {
2.     Int32 tv = *thrPtr++;
       if (tv < lowTVal) *statePtr = −1;
4.     else if (tv < highTVal) {
5.         *statePtr = (Real)random()/0x3fffffff − 1;
6.     } else *statePtr = 1;
7.     ++statePtr;
8. }
```

Lines 3, 5 and 6 of this Code Fragment 4 collectively perform the tests to see if an element is constrained and if it is set to the constrained value. Line 5 sets the random unconstrained value. The function random used in line 5 is a C library function that returns a random integer in the range of values expressible with a 32 bit unsigned integer. By dividing by the hexadecimal constant, 0x3fffffff, and subtracting 1, this is converted to a floating point value in the range from −1 to 1.

As the result of executing the above Code Fragment, the state array appears as state array 100 in FIG. 1A. Elements 103 and 104 correspond to elements constrained to be white and black, respectively.

Going back to Code Fragment 3, line 3 initializes the variable kernelSize for the main loop consisting of lines 4 through 8. The variable kernelSize is the size of the convolution kernel to be used to implement the digital filter. The initial value of kernelSize is obtained from a field in the userParams structure.

Line 5 calls the MakeDigitalFilter procedure to fill in the kernel array. The MakeDigitalFilter procedure is passed the kernelSize and dotDens variables. An alternative implementation passes other fields stored in the userParams structure if desired.

Line 6 calls the ApplyFilter procedure, which makes repeated corrections to the state array with the filter constructed in line 5.

Line 7 computes the RMS (root mean square) of all entries in the state array, and then scales all the entries corresponding to unconstrained pixels by the reciprocal of this value. The purpose of this step is to maintain the RMS value of the state array equal to 1. The values in this array usually get smaller after the adjustments from calling the ApplyFilter are made, and unless this is compensated for, the RMS value will get very close to zero after repeated execution of the main loop, which in turn causes numerical instabilities in the computations performed.

Line 8 scales the kernel size up by a factor supplied by the user and stored in the userParams structure. This factor is typically in the range from 2 to 4. Smaller values of this factor result in dot profiles slightly smoother in appearance, but cause longer execution times of the program.

This completes the execution of the main loop of the procedure. At this point the signs of the values in the state array determine a dot profile that will have the desired properties of being free from annoying patterns when physically realized as a pattern of black and white dots. Line 10 transfers this information in the slate array to the threshold array. This is accomplished by the following Code Fragment 5. Code Fragment 5 assumes the following variables have the following values prior to its execution: thrPtr is the address in computer memory of the first element in the threshold array; thrEnd is the address of the first byte just after the last element in the threshold array; statePtr is the address of the first element of the state array; and thrshVal, lowTVal and highTVal are the parameters mentioned above.

```
Code Fragment 5:

1. while (thrptr < thrEnd) {
2.      Int32 tv = *thrPtr;
3.      if (lowTVal <= tv && tv < highTval) {
4.          if (*stateptr > 0)
5.              *thrshptr = thrshVal;
6.      }
7.      ++thrPtr;
8.      ++statePtr;
9. }
```

Code Fragment 5 examines each element of the current threshold array. If the value found in a given location in the threshold array is between the lowTVal and highTVal parameters, then that location in the threshold array is either left alone or set to thrshVal, depending on the sign of the corresponding value in the state array. Other values in the threshold array are left alone. The locations in the threshold array with values between lowTVal and highTVal correspond exactly to those elements of the dot profile that are unconstrained. By only allowing these specific elements in the threshold array to change, the constrained elements of the dot profile are not changed. Those elements in the threshold array that correspond to unconstrained elements in the dot profile will all have the value lowTVal. This is because no values between lowTVal and highTVal have been stored in the threshold array up to this point. After this point, since thrshVal is greater than lowTVal and less than highTVal, comparing the threshold array against thrshVal will result in the same pattern of black and white dots, implied by the state array, for the unconstrained elements.

This completes the description of the MakeDotProfile procedure.

THE MakeDigitalFilter PROCEDURE

A digital filter is represented in computer memory as a two dimensional array of floating point values with the same dimensions as the threshold array. The entries in this array represent the convolution kernel of the filter to be implemented. It is a common and desirable practice to place the center of the convolution kernel at the coordinates (0,0). Since the desired convolution kernels of the present invention have non-zero entries all around the center, this requires that non-zero entries be stored at negative indices in the two-dimensional array representing the convolution kernel. Negative indices are not normally allowed in the C programing language, so this limitation is overcome by adding the width of the array to a negative column index, and by adding the height of the array to a negative row index. Thus, the indices are still correct, up to a multiple of the width (or the height) of the array, and negative indices are avoided. The offset of these entries by multiples of the width or height of the array is taken into account when the convolution kernel is used.

This adjustment works fine if the width and height of the convolution kernel is less than half of the width and height, respectively, of the threshold array. However, if this condition is not met, then elements of the convolution kernel from its left and right (or top and bottom) edges would map into the same locations in the array. This is resolved by adding the contributions from the different sides together and storing that value in the array.

The convolution kernels used in the present invention are Gaussian kernels. That is, the element in row R and column C of kernel array is given by the formula:

$$\exp(-(C*C+D*D)/(radius*radius))$$

Where this formula is expressed in the C programming language syntax, exp is the exponential function and radius is the radius at which the value of the kernel falls to $1/e = 0.3679$. Although this formula has been found to work in the present invention, one skilled in the art will recognize that other formulas may also be used. For example, a radial wave function with exponential decay from the center may be added to the above formula to control halftone dot size and spacing. The formula for this component would be:

$$wfactor*cos(sqrt(C*C+D*D)/wl)*exp(-sqrt(C*C+D*D)*decay)$$

where cos is the cosine function, wl is the desired dot spacing times 6.28, sqrt is the square root function, decay controls how rigid the dot spacing is and wfactor controls the overall influence of the radial wave function. Other formulas also provide useful convolution kernels under various circumstances.

The actual steps carried out by the MakeDigitalFilter procedure are specified by the following C language Code Fragment 6. The following variables are parameters of the procedure: kernelSize is the desired radius of the convolution kernel and dotDens is the dot density for the dot profile being created. The global variable kernel is the address of the first element in the kernel array.

```
Code Fragment 6:

1.  Real density =
        dotDens <= .5 ? dotDens : 1 - dotDens;
2.  Real kernelArea = 3.14159*kernelSize*kernelSize;
3.  Real alpha = 2*3.14159*density/kernelArea;
4.  Real cutOffError = 1e-4;
5.  Integer gRadius = ceil(sqrt(-log(cutOffError)/alpha));
6.  Real gaussSum = 0;
7.  Integer ix, iy;
8.  SetToZero(kernel, width, height);
9.  for (iy = -gRadius; iy <= gRadius; iy++) {
10.     for (ix= -gRadius; ix <= gRadius; ix++) {
11.         Integer distSqrd = ix*ix + iy*iy;
12.         Real g = exp(-alpha*distSqrd);
13.         Integer ic = ix;
14.         Integer ir = iy;
15.         while (ic < 0) ic += width;
```

```
Code Fragment 6:

16.         while (ir < 0) ir += height;
17.         while (ic > width) ic -= width;
18.         while (ir > height) ir -= height;
19.         kernel[ic + ir*width] += g;
20.         gaussSum += g;
21.     }
22. }
```

Line 1 computes the so called "minority density", which is the density of the color of the dot that is in the minority with respect to the other color of the dot. The minority density is inversely related to the average spacing between dots of the minority color. It has been found that the kernel size should be enlarged by a factor equal to the spacing of the minority color dots. This is taken into account in line 3. Line 2 computes the desired area of the convolution kernel before the minority spacing is taken into account. Line 3 computes the multiplier alpha that will be used in the exponential function to achieve the desired size convolution kernel. Since the Gaussian kernel approaches zero as it is evaluated further and further from the center, without actually reaching zero, a cutoff point must be established beyond which the Gaussian kernel will be assumed to be zero. Line 4 specifies the maximum error to be allowed from setting this cutoff to be $10^{-4}$. Line 5 computes the radius over which the kernel will have to be evaluated in order to achieve the error limit in line 4. Line 6 initializes the global variable gaussSumwhich will be the sum of the entries in the convolution kernel upon completion of this procedure. This value will be used later in the program. Line 8 initializes all of the entries in the convolution kernel to be zero. Lines 9, 10 and 11 set up a double loop that will enumerate all of the locations in the convolution kernel for which values need to be computed. The variables ix and iy will be coordinates of a given location. Lines 11 and 12 compute the value g, the Gaussian function for the given location. Lines 13 through 18 compute the row and column index in the kernel array from the variables ix and iy. This computation accounts for ix and iy which possibly may be negative, or foe ix and iy that are beyond the size of the kernel array. Line 17 adds the computed Gaussian function to the appropriate entry in the kernel array. Line 20 adds the computed Gaussian function to the variable gaussSum.

This completes the description of the MakeDigitalFilter procedure. Upon its completion the kernel array has the desired convolution kernel stored in it and the gaussSum variable has the sum of the entries in the kernel array stored in it.

THE ApplyFilter PROCEDURE

The overall logic of this procedure is given in the following pseudo Code Fragment 7. The abbreviation "filtered array" will be used for "filtered dot profile" array hereinafter.

```
Code Fragment 7:

1. ApplyFilter(
        struct UserParams* userParams,
        Real dotDens, Integer lowTVal, Integer highTVal)
    {
2.      for (count=0; count < userParams->nIters; count++) {
3.          Initialize the filtered array;
4.          Apply digital filter to filtered array;
```

```
Code Fragment 7:

5.          Adjust values in state array,
                based on filtered array
6.      }
7.   }
8. }
```

Line 1 of pseudo Code Fragment 7 shows the user-specified parameters userParams of the procedure, which include dotDens the density of white dots in the desired dot profile, and lowTVal and highTVfal, which have the same meanings as for the MakeDotProfile procedure.

Line 2 controls the execution main loop of the procedure, consisting of lines 3 through 7. This loop is executed userParams→nIters times. This is a field in the user parameter structure specified by the user.

Line 3 is the first step in the main loop of the procedure. In this step the filtered array is initialized to represent the (unfiltered) dot profile. Locations in this array are set to 0 for dots that would be black in the current dot profile and 1 for dots that would be white in the current dot profile. The current dot profile is computed from the sign of the values in the state array. More explicitly, in locations where the state array is greater or equal to zero, a one is entered into the filtered array; at other locations a 0 is entered.

In FIG. 1B, filtered array 200 shows the state of the filtered array at this point. White squares correspond to the value 1 stored in the filtered array, and dark gray squares correspond to the value 0. Element 201 (with value 0) in this array corresponds to element 101 (with a negative value) in the state array 100 shown in FIG. 1A. Likewise, element 202 in the dot profile array in FIG. 1B (with value 1) corresponds to element 102 (with a positive value) in the state array 100 in FIG. 1A.

Line 4 applies the digital filter to the filtered array. In order to avoid the appearance of "seams" at the edges the resulting dot profiles when they are tiled next to one another, the filtering is performed as if both the convolution kernel and the array being filtered "wrap around" at the edges. Or to put it another way, the left edges of each array are considered to be contiguous with the right edges, and likewise the top edges of each array are considered to be contiguous with the bottom edges. The convolution kernel has already been prepared in a manner consistent with this aim. This can be accomplished in the filtered array by using modular arithmetic to bring array indices that might fall outside a given array into the existing range of values.

To explain this concept further, consider the following Code Fragment 8 that computes the filtered value, in the variable filteredValue, at the coordinates given by the variables kx and ky.

```
Code Fragment 8:

1. Real filteredValue = 0;
2. Integer ix, iy;
3. for (iy = -gRadius; iy <= gRadius; iy++) {
4.      for (ix= -gRadius; ix <= gRadius; ix++) {
5.          filteredValue +=
                fltPtr[ix + width*iy]*
                kernel[(kx - ix) + width*(ky - iy)];
6.      }
7. }
```

Line 5 multiplies the entry in the filtered array at location (ix,iy) with the location (kx–ix,ky–iy) in the kernel array.

The coordinates in the latter expression are likely to be outside the allowed ranges of 0 to width−1 for the first coordinate, and 0 to height−1 for the second coordinate for some values of kx and ky. This is where the modular arithmetic comes in. The above Code Fragment is modified to account for this as follows:

---
Code Fragment 9:
---
```
1.  Real filteredValue = 0;
2.  Integer ix, iy;
3.  for (iy = −gRadius; iy <= gRadius; iy++) {
4.      for (ix= −gRadius; ix <= gRadius; ix++) {
5.          Integer rx = kx − ix;
6.          Integer ry = ky − iy;
7.          while (rx < 0) rx += width;
            while (ry < 0) ry += height;
9.          while (rx > width) rx −= width;
10.         while (ry > height) ry −= height;
11.         filteredValue +=
                fltPtr[ix + width*iy]*
                kernel[rx + width*ry];
12.     }
13. }
```
---

Lines 5 through 10 perform the modular arithmetic operation that brings kx−ix into the range from 0 to width and ky−iy into the range from 0 to height.

Since Code Fragment 9 also demonstrates how digital filtering is accomplished, some other comments are in order. The two nested loops (lines 3 and 4) enumerate a range of indices from −gRadius to gRadius. This is the same value that was computed in line 5 of Code Fragment 6 described earlier for the MakeDigitalFilter procedure. Since the entries in the kernel array are zero outside of this radius, time can be saved by only performing these computations inside a square of this radius. However, it is possible for gRadius to be greater than or equal to ½ one of the dimensions of the threshold array, in which case the limit of enumeration would have to be from 0 to width−1 in the horizontal direction and 0 to height−1 in the vertical direction. The above Code Fragment computes the filtered value only for the location (kx,ky). In order to filter the entire array, this code has to be executed for all values of kx and ky. The filtered values cannot be stored back into the filtered array as they are computed. Instead they must be stored in a temporary array and copied back after they are all computed.

The above Code Fragment is essentially taking a weighted sum of the unfiltered values in circle of radius gRadius about the location given by kx, ky. This sum, when divided by the sum of values in the kernel array, gives a weighted average gray value for pixels in a circle centered about the location (kx,ky). The values closer to the center of the circle are weighted higher; the values farther away are weighted lower. The exact weighting is determined by the convolution kernel whose formula was given above. Thus, the operation of filtering replaces a given unfiltered element with a weighted sum of the original unfiltered (i.e. dot profile) value in an area that is determined by the convolution kernel and the position of the given element. In the case of a Gaussian kernel, the area is a circle and the size of the circle varies with the kernelSize parameter computed in the MakeDotProfile procedure.

Another way to accomplish the digital filtering operation is by means of a two-dimensional, fast Fourier transform, or "2D FFT". The 2D FFT is carried out using steps well known to those skilled in the art. For example, explicit computer code for a 2D FFT is given in "Numerical Recipes" by Press et al. Cambridge University Press, 1986.

The filter operation is achieved with the 2D FFT using the following steps. First the 2D FFT of the unfiltered values initially stored in the filtered array is computed and stored in a first auxiliary array of complex numbers. Second, the 2D FFT of the kernel array is computed and stored in a second auxiliary array of complex numbers. (This step may be performed outside of the main loop, as the kernel array does not change within the confines of this loop.) Third, each element of the first auxiliary array is multiplied by the element in the corresponding position in the second auxiliary array. The final step is to perform the inverse 2D FFT on the first auxiliary array, storing the results back into the filtered array. This completes the filtering process. When the size of the convolution kernel (gRadius) is large, this method is faster than the method explained in Code Fragment 9 and in the following paragraphs. Also, the FFT method automatically simulates the desired wrap-around effect.

After filtering, the filtered array appears as filtered dot profile 300 in FIG. 1C. Here darker grays correspond to values near 0 and lighter grays correspond to values near gaussSum, which is the sum of all entries in the convolution kernel. For example, element 303 in this filtered dot profile array is the weighted sum of the elements in the unfiltered dot profile array 200 in FIG. 1B contained in the circle having parts 204A and 204B. The circle is split into two parts, 204A on the left and 204B on the right. This demonstrates how the wrap-around features of the digital filtering computations work. If the circle were in one piece, the left edge of the circle would go beyond the left edge of the array. This corresponds to locations in the circle having negative x coordinates on the left edge. The modular arithmetic code, above, corrects these negative indices by adding the width of the array to them so they end up on the right side of the array as shown in partial circle 204B.

Line 5 in pseudo Code Fragment 7 performs adjustments on values of the state array. The exact mechanism for these adjustments is set forth in the following C language Code Fragment 10. The following variables are assumed to be set up prior to the execution of the fragment: thrshPtr is a pointer to the first element in the threshold array; endThrsh is a pointer to the first element past the end of the threshold array; stateptr is a pointer to the first element in the state array; and filtPtr is a pointer to the first element in the filtered array. The variables lowTVal, highTVal and dotDens are parameters to the procedure. The variable gaussSum was computed in the MakeDigitalFilter procedure, above.

---
Code Fragment 10:
---
```
1. const Real kGamma = .968;
2. const Real hyst = 0.1;
3. Real grayAvg = gaussSum*dotDens;
4. while (thrshPtr < endThrsh) {
5.     Real tv = *thrshPtr++;
6.     if (fLowTVal <= tv && tv < fHighTVal) {
```

-continued

Code Fragment 10:

```
7.      Real state = *statePtr;
8.      Real dotColor = state < 0 ? 0 : 1;
9.      Real adjustment =
            grayAvg - *filtPtr +
            hyst*(2*dotColor - 1);
10.     *statePtr =
            kGamma*state + (1-kGamma)*adjustment*(10/gaussSum);
11.     }
12.     ++statePtr;
13.     ++filtPtr;
14. }
```

Lines 1 and 2 of this Code Fragment define constants, kGamma and hyst, that will be used later in the code. Line 3 computes the variable, grayAvg, the value that would be stored in each element of the filtered array if the desired dot density was achieved in all areas. This element is computed by multiplying the desired dot density by the sum of the entries in the convolution kernel. Line 4 controls the loop consisting of lines 5 through 13. This loop enumerates each location of the threshold array.

Line 5 fetches the value from the current location in the threshold array and stores it in the variable tv. Line 6 performs a check on tv to see if the corresponding location in the dot profile is unconstrained, and if so, lines 7 through 10 are executed. Line 7 fetches the value from the current location in the state array and stores in state. Line 8 computes the value of the unfiltered dot profile at the current location and stores it in dotColor.

Line 9 computes an adjustment to the state array at the current location. This adjustment consists of two parts. The first part is the difference between the desired filtered value and the actual filtered value, grayAvg−*filtPtr. This part of the adjustment constitutes a correcting influence that makes areas of the dot profile that are too dark lighter, and vice versa. The second part of the adjustment, hyst,(2, dotColor−1), constitutes a conservative influence that tends to keep a white dot white and a black dot black. The variable hyst is a hysteresis constant that controls the magnitude of this influence.

The need for the correcting influence is clear: it is what evens out the areas of the dot profile that are too dark or too light, thus eventually producing a dot profile free of annoying patterns.

The conservative influence is more subtle. One purpose of the conservative influence is to cause the iterated adjustments to converge to a definite value. Thus the possibility of correcting the dot profile on one iteration of the main loop of the procedure, only to have it corrected back to where it was on a succeeding loop, is avoided.

A second purpose of the conservative influence is that it keeps the original values of the state array intact as much as possible, when not overridden by the correcting influence. This is desirable in that the state array is initialized with random values, and it is desirable to preserve this random influence in the dot placement of the final dot profile. Random dot placement reduces further the annoying patterns in the dot profiles and moire patterns caused by overlapping dot patterns. A further benefit to the conservative influence is that when several different digital filters are used consecutively, the beneficial work done by the first filters is not undone by applying later filters.

The correcting influence and the conservative influence are opposing numerical quantities. In general, the correcting influence will win out whenever the error in the weighted sum of the elements in the dot profile around a particular pixel is larger than the variable hyst.

Note that if the state array were initialized with some pattern other than a random pattern, the conservative influence would preserve that pattern, as much as possible, while the correcting influence made corrections to the average gray value of the dot profile. This can be of benefit in smoothing out dot profiles that arise when more than one non-identical halftone cell is included in a threshold array. In such a case, the initial pattern is an array of halftone dots as in conventional screening. Thus the present invention is also useful in eliminating patterns from other types of threshold arrays as well as random threshold arrays.

Line 10 modifies the value in the state array according to the adjustment just made. This is done by setting the value in the state array to a weighted average of the current value with the adjustment. Note that adjustment is multiplied by 10/gaussSum to counteract the large values of adjustment that occur with larger convolution kernels. In this way the value in the state array is adjusted gradually, over a number of iterations of the main loop, in the direction of the adjustment. This is necessary so that not too many elements in the state array change sign in a single iteration of the main loop. This insures that the values in the state array will converge to stable values as the main loop of the procedure is executed.

Note also, that if a pixel in the dot profile is black, and the average computed in the filtered array is too light, the adjustment is such that the pixel in the dot profile stays black. The same is true for a white pixel in an area where the average is too dark. Only pixels-that are black in an area that is too dark, or white in an area that is too light, can change. Also, only pixels that are unconstrained can change. Of these pixels, only that fraction where the above adjustment causes the value of the corresponding element in the state array to change sign will be selected to reverse their color. Since the initial values in the state array are random, this selection has a random component in addition to a deterministic component.

MODIFICATIONS TO PREVENT DOT GAIN PATTERNS

The method described above has been found to work well on digital output devices where the dot gain is well controlled. Dot gain is a physical phenomenon where the color of dots surrounding a central dot influences the color of that central dot. On an ideal digital output device, the color of each dot would be totally independent of such influence. However, most actual devices cannot achieve this ideal goal. Dot gain can cause a substantial change in the actual average gray value of a group of dots from the theoretical value computed in the above program. Thus the correcting influence of the code in the ApplyFilter procedure may not be able to correct for differences in gray values due to dot gain. Local variations in dot gain, then, can cause annoying patterns on some output devices.

A few minor modifications to the above procedures can remedy this problem. The first modification is to insert a second call to ApplyFilter after the first call at line 6 in Code Fragment 3. Let us call this line 6.5. The two calls also have a fifth parameter added which is 0 for the first call and 1 for the second. The ApplyFilter in Code Fragment 7 needs to have this fifth parameter added to it in line 1. (See Code Fragment 11 below.) The final modification is that a step is inserted between lines 3 and 4 in Code Fragment 7 that models the dot gain of a typical output device.

Basically, there are three kinds of dot gain: black dot gain; white dot gain; or both. All of these types can be modeled by one parameter for black dot gain and one parameter for white dot gain. The dot gain modeling code modifies elements in the filtered array as follows. A black (0) element is incremented by adding the white dot gain factor times the number of white pixels horizontally or vertically adjacent to it. A white (1) element is decremented by subtracting the black dot gain factor times the number of black pixels horizontally or vertically adjacent to it. The subject invention, for example, may use a white dot gain factor of 0 (i.e. no white dot gain) and a black dot gain factor of 0.12.

Figure 3A:
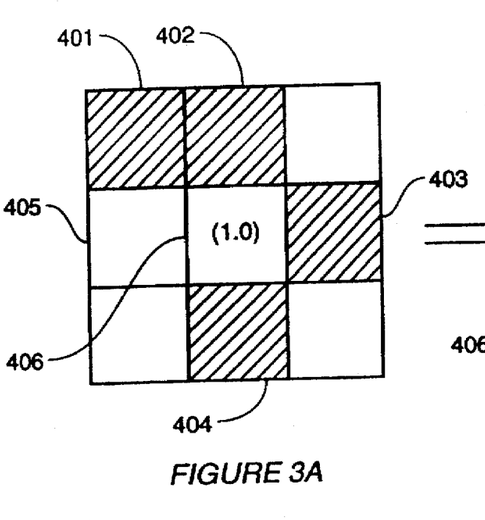
FIGS. 3A to 3D are graph illustrating the dot gain on a hypothetical section of a dot profile.

The dot gain modeling computations are shown in FIG. 3A. Element 406 is a hypothetical white pixel surrounded by nine pixels as shown. The black dot gain on pixel 406 is computed by counting the number of black pixels horizontally or vertically adjacent. There are three such pixels 402, 403 and 404. Even though pixel 401 is black, it is adjacent diagonally, not horizontally or vertically, so it is not counted. Also, even though pixel 405 is adjacent horizontally, it is white so it also is not counted.

Figure 3B:
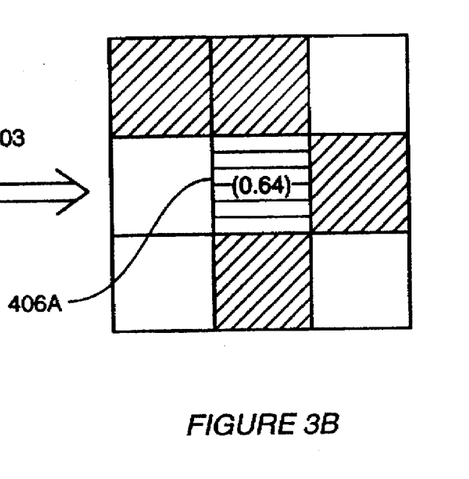

Thus the total black dot gain is three times the black dot gain parameter (0.12) or 0.36. This value is subtracted from the value of the white pixel, previously 1, to yield the final value 0.64, as shown in the center pixel 406A in FIG. 3B. If pixel 406 were black, there would be no adjustment of it for black dot gain.

Figure 3C:
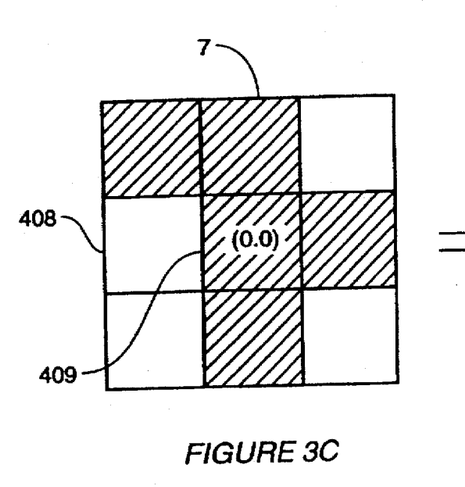
Figure 3D:
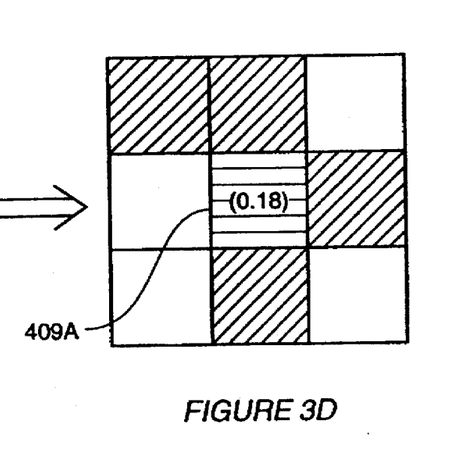

FIG. 3C shows a white dot gain computation on a hypothetical pixel 409. In this case there is one horizontally or vertically adjacent white pixel, pixel 408, so the total white dot gain is 1 times the white dot gain parameter, 0.12, to yield 0.12. This value is added to the value of the black pixel 406 in FIG. 3A, 0, to yield the final value, 0.12, as shown as pixel 409A in FIG. 3D. If pixel 409 were white, there would be a white dot gain adjustment.

These modified elements are stored in an auxiliary array, which is copied back to the filtered array upon computation of all values. Once this modeling code is executed, the elements in the filtered array are filtered as usual. When the adjustment step (line 5 in Code Fragment 7) is executed, corrections are made to the dot profile based upon the modeled dot gain as opposed to the strict averages of the gray values. Thus dot gain can be corrected for in this way.

The modified pseudo code for MakeDotProfile is as follows:

```
Code Fragment 11:

1.  MakeDotProfile(
        struct UserParams* userParams,
        Real dotDens, Integer lowTVal,
        Integer highTVal, Integer thrshVal) {
2.  Initialize state array with random values.
3.  kernelSize = userParams->initialSize;
4.  while (kernelSize < userParams->finalSize) {
5.      MakeDigitalFilter(kernelSize, dotDens);
6.      ApplyFilter(
            userParams, dotDens, lowTVal, highTVal, 0);
6.5     ApplyFilter(
            userParams, dotDens, lowTVal, highTVal, 1);
7.      Rescale entries in the state array;
8.      kernelSize = kernelSize * userParams->sizeInc;
9.      }
10. Store dot profile info into threshold array;
11. }
```

The modified pseudo code for ApplyFilter is as follows:

```
Code Fragment 12:

1.  ApplyFilter(
        struct UserParams* userParams,
        Real dotDens, Integer lowTVal, Integer highTVal,
        Integer modelDotGain)
    {
2.      for (count=0; count < userParams->nIters; count++) {
3.          Initialize the filtered array;
3.1         if (modelDotGain > 0)
3.2             ModelDotGain;
4.          Apply digital filter to filtered array;
5.          Adjust values in state array,
                based on filtered array
6.      }
7.  }
8. }
```

Note that the execution of the dot gain modeling code is controlled by the fifth parameter. Thus on the first call to ApplyFilter from line 6 of Code Fragment 3, the dot gain modeling code is not executed, whereas on the second call, it is. This allows the dot profile to be adjusted alternately for smoothness both in the presence of dot gain on the output device or in its absence. It has been found that this alternation technique reduces the patterns that occur with a given dot profile on both high and low dot gain devices.

This is important because the actual amount of dot gain on a given device can vary with environmental factors, such temperature and humidity, often beyond the control of the user. By constructing a dot profile that appears smooth both in the presence and absence of dot gain, it has been found that this dot profile reproduces well on devices with a range of dot gain parameters.

It is sometimes advantageous to turn on the dot gain modeling in the first call to ApplyFilter, and to turn it off in the second call. It is also sometimes beneficial to turn the dot gain modeling on and off on successive times through the main loop of the ApplyFilter procedure. Other sequences which turn the modeling on or off may also be used. Also, it is has been found that superior results are obtained by leaving all dot gain modifications out when producing threshold arrays for devices with little or no dot gain.

Using the technique of the invention, dot profiles are produced that are free of annoying patterns. They will tile without seams and can be constructed with any desired dot density. Moreover, dot profiles are produced with the additional constraint that some elements remain black while others remain white. A plurality of such dot profiles with suitable constraints may be assembled into a single threshold array which, when compared against the image gray values, yields the constituent dot profiles. Such a threshold array can be used in a variety of digital display devices to achieve superior halftoning free of annoying patterns and moire effects. Moreover, the dot profiles themselves can be used to advantage when it is desirable to reproduce flat gray tones on a digital display device.

The description of the invention has been in terms of a program running on a digital computer, but one skilled in the art will realize that other embodiments are possible, such as those employing special purpose digital hardware. Moreover, the description of the computer program has in many cases assumed a digital display device that produces black or white dots. However, one skilled in the art will realize that the same techniques can be applied to any digital display device that can only reproduce a fixed set of colors of any sort or a fixed set of shades of gray.

As will be understood by those skilled in the art, many changes in the apparatus and methods described above may be made by the skilled practitioner without departing from the spirit and scope of the invention, which should be limited only as set forth in the claims which follow.

I claim:

1. A method of displaying on a digital display device an image made up of a plurality of pixels, each having a particular color, using a threshold array made up of a plurality of dot profiles, the dot profiles being made up of a plurality of black or white pixels, certain of the pixels in certain of the dot profiles being constrained to be either black or white, the method using a plurality of digital filters, comprising the following steps:

(1) assigning a value to each unconstrained pixel of one of the dot profiles, each such value being interpretable as one of the two colors black or white;

(2) based upon whether a function of a digital filter value at a predetermined pixel is different from a predetermined desired value at such pixel, adjusting the value assigned to that particular pixel such that in some instances, the adjusted value is interpretable as the other of the two colors; and (3) repeating step (2) for additional pixels in the dot profile until the entire dot profile has been covered;

(4) changing the digital filter and repeating steps (2) and (3) for the same dot profile;

(5) repeating steps (1) through (4) for each of the dot profiles in the threshold array, whereby the resulting dot profiles are substantially free of artifacts;

(6) assembling the dot profiles into a threshold array made up of a set of reference gray values;

(7) sampling the image to be reproduced at each pixel of the display device to obtain an image gray value;

(8) selecting a reference gray value for that pixel from the threshold array corresponding to the sampled image gray value for that pixel;

(9) comparing the image gray value for that pixel against the reference gray value for that pixel to obtain the color of the pixel to be displayed;

(10) displaying an image on the digital display device, including each of the pixels with the color determined by the comparison of step (9).

2. The method of claim 1 wherein the values assigned in step (1) are random values.

3. The method of claim 1 wherein the adjustment to the value assigned to a particular pixel is composed of a correcting influence and a conservative influence.

4. The method of claim 1 wherein the adjustment of each mixed is separately modified to compensate for dot gain.

5. The method of claim 4 wherein the modification to the adjustment of each pixel is separately modified to produce a dot profile that appears smooth both in the presence or absence of dot gain.

* * * * *